(12) United States Patent
Jackson et al.

(10) Patent No.: US 8,811,707 B2
(45) Date of Patent: Aug. 19, 2014

(54) SYSTEM AND METHOD FOR DISTRIBUTED PROCESSING OF TOMOGRAPHIC IMAGES

(75) Inventors: John Irvin Jackson, Brookfield, WI (US); Darin Robert Okerlund, Muskego, WI (US); Bernhard Erich Hermann Claus, Niskayuna, NY (US); Maria Iatrou, Hoboken, NJ (US); Jed Douglas Pack, Glenville, NY (US)

(73) Assignee: General Electric Company, Schenectady, NY (US)

( * ) Notice: Subject to any disclaimer, the term of this patent is extended or adjusted under 35 U.S.C. 154(b) by 389 days.

(21) Appl. No.: 13/218,236

(22) Filed: Aug. 25, 2011

(65) Prior Publication Data

US 2013/0051643 A1   Feb. 28, 2013

(51) Int. Cl.
*G06K 9/00* (2006.01)
*G06T 11/00* (2006.01)

(52) U.S. Cl.
CPC ........... *G06K 9/00* (2013.01); *G06T 11/003* (2013.01)
USPC .......................................... 382/131; 382/274

(58) Field of Classification Search
None
See application file for complete search history.

(56) References Cited

U.S. PATENT DOCUMENTS

| | | |
|---|---|---|
| 4,144,569 A | 3/1979 | Wagner |
| 5,657,364 A | 8/1997 | Pfoh |
| 5,671,263 A | 9/1997 | Ching-Ming |
| 6,233,478 B1 | 5/2001 | Liu |
| 6,236,705 B1 | 5/2001 | Stergiopoulos et al. |
| 6,304,277 B1 * | 10/2001 | Hoekstra et al. ............. 345/600 |
| 6,426,992 B1 | 7/2002 | Kohler et al. |
| 6,442,229 B1 | 8/2002 | Koehler et al. |
| 6,535,570 B2 | 3/2003 | Stergiopoulos et al. |
| 6,542,572 B2 | 4/2003 | Danielsson et al. |
| 6,665,370 B2 | 12/2003 | Bruder et al. |
| 6,778,629 B1 | 8/2004 | Danielsson et al. |
| 7,702,063 B2 * | 4/2010 | Koehler et al. ................ 378/4 |
| 2004/0136490 A1 * | 7/2004 | Edic et al. ..................... 378/4 |
| 2008/0100621 A1 * | 5/2008 | Aharon et al. ............... 345/424 |
| 2011/0142313 A1 | 6/2011 | Pack et al. |

* cited by examiner

*Primary Examiner* — Shefali Goradia
(74) *Attorney, Agent, or Firm* — Ziolkowski Patent Solutions Group, SC

(57) ABSTRACT

A system and method for distributed and coordinated image processing of tomographic images utilizing processors on a medical imaging device and a separate workstation is disclosed. The system includes an image acquisition device to acquire image data of a subject and an image processor to receive the image data therefrom. The image processor is programmed to reconstruct initial images of a region-of-interest (ROI) from the image data, identify initial images on which to perform image correction, and generate an image correction request for the images identified for image correction, with the image correction request specifying a processing operation to be performed on the respective images. The image processor is further programmed to transfer the reconstructed initial images to a separate workstation that automatically initiates the image correction upon verifying a presence of an image correction request on the initial images so as to generate corrected images.

27 Claims, 3 Drawing Sheets

SYSTEM AND METHOD FOR DISTRIBUTED PROCESSING OF TOMOGRAPHIC IMAGES

BACKGROUND OF THE INVENTION

Embodiments of the invention relate generally to image processing techniques and, more particularly, to systems and methods for distributed and coordinated image processing of tomographic images utilizing processors on a medical imaging device and processors on a separate workstation.

Cardiac imaging is a critical function in clinical applications. Characterization of myocardial motion enables better understanding of the physiology of a heart and early detection of cardiovascular diseases. Particularly, cardiologists employ CT angiography (CTA) images to diagnose and characterize the extent of heart disease. Imaging the heart, however, is particularly challenging, as the heart is a moving object that rotates, translates and deforms non-rigidly in a three-dimensional (3D) space. Conventional CT image reconstruction methods generally assume that an object is stationary during data acquisition. In cardiac imaging, application of the conventional reconstruction methods may result in image blurring and other motion artifacts in the reconstructed images due to heart motion. The artifacts can severely affect a diagnosis that uses these reconstructed images, especially if the imaged features are small. For example, plaques formed in coronary arteries are generally indicative of a risk of a potential heart attack, but are difficult to image due to their small size. Non-optimal reconstruction of such small features may result in incorrect diagnosis resulting in serious consequences. Therefore, an ability to produce high-resolution images is critical to clinical diagnosis.

In an effort to mitigate effects of motion artifacts in CT imaging, some current imaging methods employ complex image reconstruction techniques. For example, one approach utilized in present day scanners is the reconstruction of images at multiple phases in an attempt to select a volume reconstructed at the most quiescent phase of the heart. However, the temporal resolution in currently available CT scanners does not suffice for motion free cardiac imaging of all coronary segments at higher heart rates or highly variable heart rates. Certain other techniques relate to model-based estimation requiring reconstructions of several cardiac phases to estimate the motion. Such techniques, however, involve computationally intensive image reconstruction.

While such complex image reconstruction techniques employed in cardiac CT imaging may produce high-resolution images in which motion artifacts are mitigated, such complex image reconstruction techniques also raise a number of computational challenges. That is, it is recognized that if complex image reconstruction employs reconstruction processors associated with the CT scanner, availability of the CT scanner for the next patient may be compromised, as the image reconstruction may impact system performance during a next clinical exam, such as preventing the rapid processing and display of CT images needed during a next clinical exam.

It is also recognized that, with respect to cardiac CT imaging, the clinical workflow of patients able to be imaged by the CT system can be negatively affected if too much responsibility is placed on the technologist performing the scanning operation. In a typical cardiac CT imaging process, once the image data has been acquired, the CT system technologist looks at the data to confirm that good data has been acquired, so that the patient can be released and the next patient can be scanned. However, the technologist may not have any time to focus on identifying any areas within a region-of-interest that may have been missed, such as coronary arteries or portions of the coronary arteries that automatic segmentation algorithms may have missed. Ideally, such identification of deficiencies in the image processing could be performed by a clinician or a clinician's assistant, such that deficiencies in the processing can be rapidly edited and reprocessed and motion estimation and correction may be applied to these regions at the CT system without any further input from the CT system technologist. It is further desirable that review of reconstructed images by a physician be provided for in a timely manner, so as to allow for the directing of additional processing in conjunction with clinical assessment of the images.

Therefore, it would be desirable to develop a system and method for processing imaging data that accommodates the competing desires for an automated workflow that still allows human interaction, minimal data transfer across a network, the use of computational processing in multiple locations within a network, and the ability to direct additional processing in conjunction with clinical assessment of the images.

BRIEF DESCRIPTION OF THE INVENTION

Embodiments of the invention are directed to a system and method that provides distributed and coordinated image processing of tomographic images utilizing processors on a medical imaging device and processors on a separate workstation In accordance with one aspect of the invention, an imaging system includes an image acquisition device configured to perform a scanning operation to acquire image data of a subject and an image processor operably connected to the image acquisition device to receive the image data therefrom. The image processor is programmed to reconstruct one or more sets of initial images of a region-of-interest (ROI) from the acquired image data, identify one or more sets of initial images on which to perform image correction, and generate an image correction request for each set of images identified for image correction, with the image correction request specifying a processing operation to be performed on the respective set of images. The image processor is further programmed to transfer the one or more sets of reconstructed initial images to a workstation separate from the imaging system, with the workstation automatically initiating the image correction upon verifying a presence of an image correction request on the sets of initial images so as to generate corrected images.

In accordance with another aspect of the invention, a method for processing image data includes the steps of acquiring image data sets of a subject by way of an image acquisition device, reconstructing one or more sets of initial images of a region-of-interest (ROI) from the image data sets using a reconstruction processor on the image acquisition device, and transferring the one or more sets of initial images to a workstation separate from the image acquisition device. The method also includes the steps of identifying sets of initial images on which to perform image correction processing, automatically initiating, at the workstation, the image correction processing on each set of initial images identified for image correction processing so as to generate processed images, and storing the processed images at the workstation.

In accordance with yet another aspect of the invention, a method for distributed processing of computed tomography (CT) cardiac image data includes the steps of acquiring CT cardiac image data of a subject by way of an image acquisition device, reconstructing one or more sets of initial images of a cardiac region from the CT cardiac image data using a reconstruction processor on the image acquisition device, and transferring the one or more sets of initial images and any non-reconstructed image data sets to a workstation remote from the image acquisition device. The method also includes the steps of identifying sets of initial images on which to perform motion estimation and correction and automatically initiating, at the workstation, the motion estimation and correction on each set of initial images identified for motion estimation and correction so as to generate motion corrected images.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are generally applicable to any tomographic imaging system and encompass imaging systems such as x-ray systems, magnetic resonance (MR) systems, ultrasound systems, computed tomography (CT) systems, positron emission tomography (PET) systems, nuclear medicine, single photon emission computed tomography (SPECT) systems, and other types of imaging systems. Thus, while embodiments of the invention herein will be described here below with particular respect to a CT imaging system, it is to be understood that the embodiments of the invention are generally applicable to any tomographic imaging system.

Figure 1:
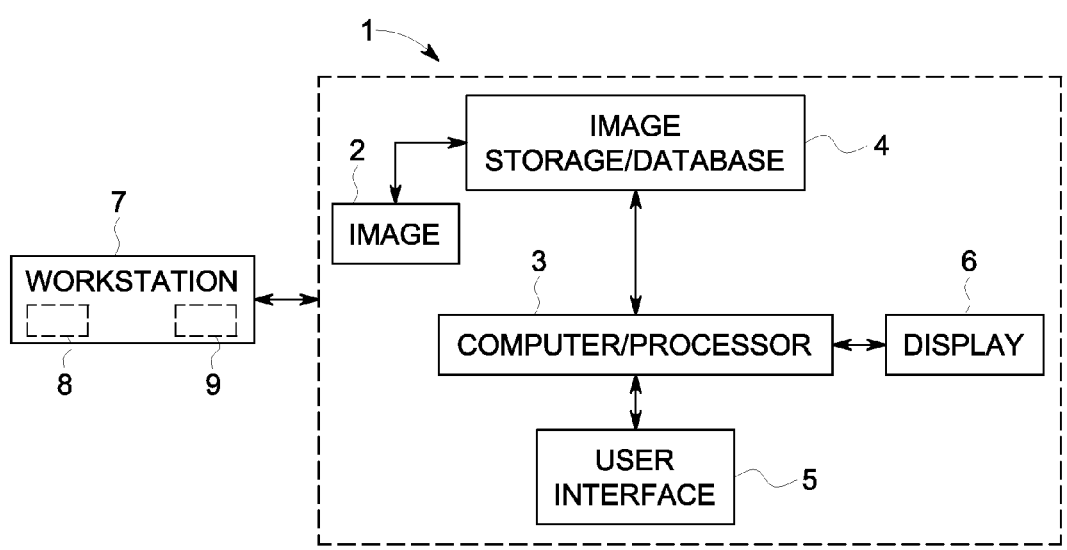
FIG. 1 is a block schematic diagram of a tomographic imaging system.

Referring to FIG. 1, a schematic block diagram of a general tomographic imaging system 1 for use with embodiments of the invention is illustrated. Imaging system 1 includes an image acquisition device 2 that, according to embodiments of the invention, is a device capable of imaging a subject via any type of modality including magnetic resonance imaging, computed tomography imaging, x-ray imaging, or the like. In addition, image data acquired by image acquisition device 2 may be based on any type of scanning sequence or imaging parameter setup.

A computer or processor 3 is provided that receives imaging data from image acquisition device 2 and performs image reconstruction. An image storage or database 4 is included in imaging system 1 that is configured to store images generated by computer/processor 3. An operator console 5 is provided that has some form of operator interface, such as a keyboard, to provide or input commands and scanning parameters to computer/processor 3. A display 6 coupled to computer/processor 3 that visually depicts reconstructed images of a desired region-of-interest (ROI) of a subject.

As further shown in FIG. 1, a workstation 7 that is separate from imaging system 1 is provided to perform additional image processing on image data acquired by imaging system 1. The workstation 7 includes one or more processors 8 and a memory 9. As will be set forth in detail below, according to embodiments of the invention, workstation 7 receives images or image data from imaging system 1 in order to perform additional operator specified processing thereon.

Figure 2:
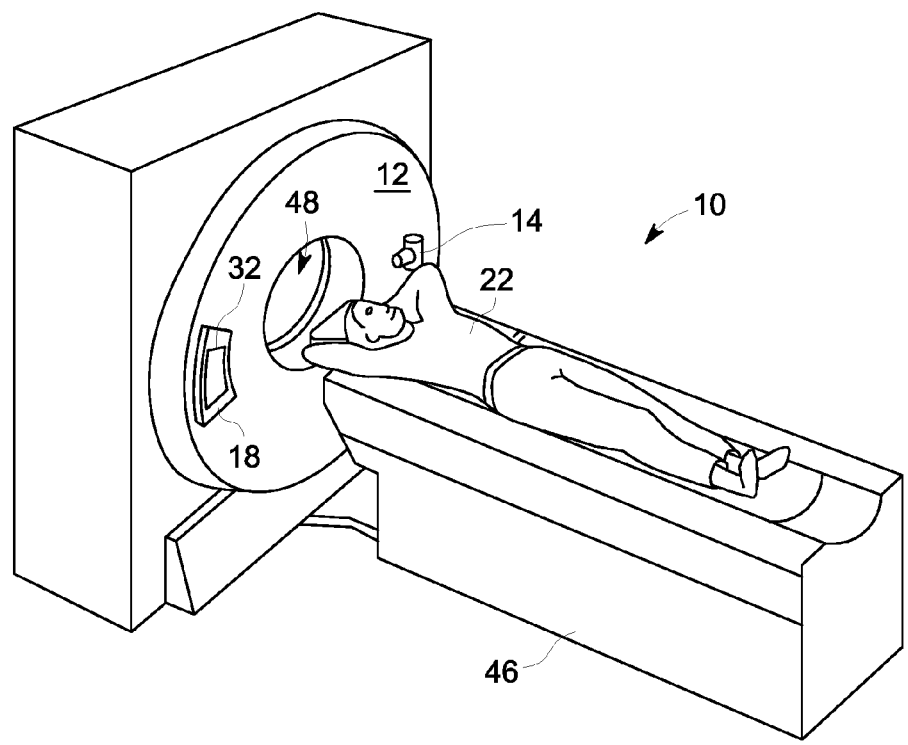
FIG. 2 is a pictorial view of a CT imaging system.
Figure 3:
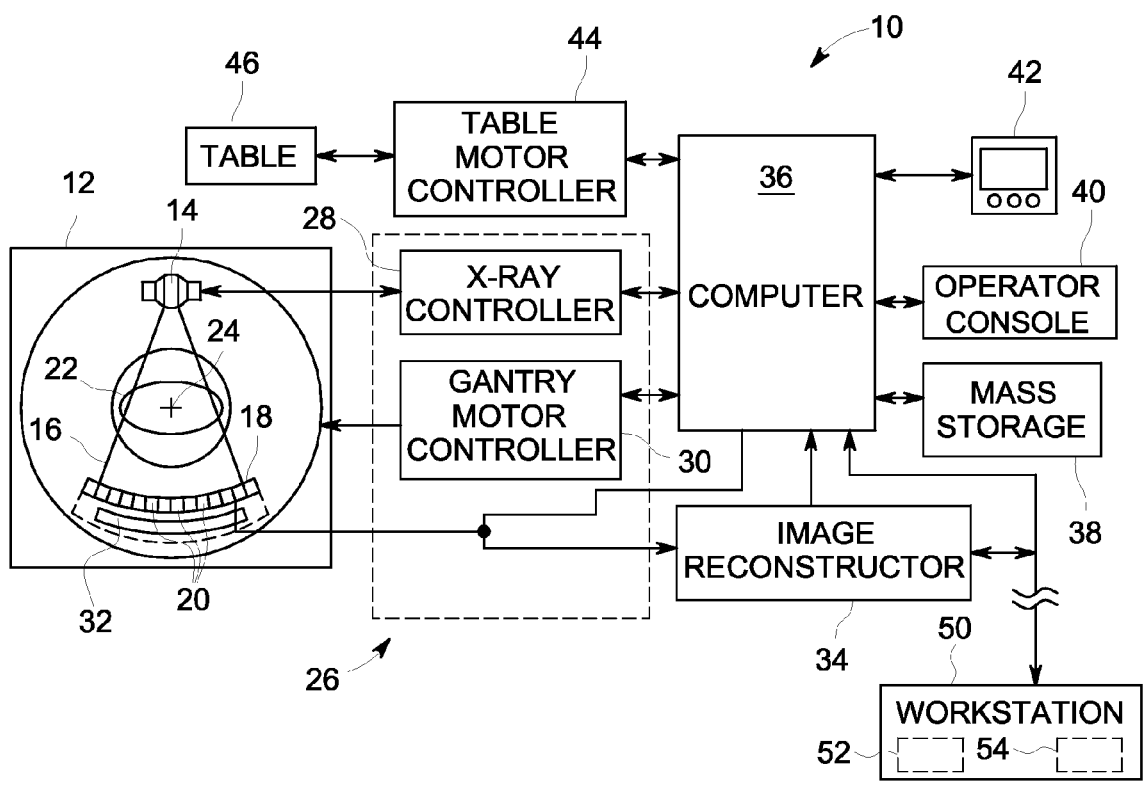
FIG. 3 is a block schematic diagram of the CT imaging system illustrated in FIG. 2.

While embodiments of the invention include acquiring images from any of multiple of imaging modalities, FIGS. 2 and 3 illustrate the major components of a computed tomography (CT) imaging system incorporating an embodiment of the invention as an example. Referring to FIGS. 2 and 3, the operating environment of the invention is described with respect to a sixty-four-slice computed tomography (CT) system. However, it will be appreciated by those skilled in the art that the invention is equally applicable for use with other multi-slice configurations, such as configurations extending up to 256 slices and beyond or below. The invention will be described with respect to a "third generation" CT scanner, but is equally applicable with other CT systems.

As shown in FIG. 2, a CT imaging system 10 is shown as including a gantry 12 representative of a "third generation" CT scanner. Gantry 12 has an x-ray source 14 that projects a beam of x-rays toward a detector assembly or collimator 18 on the opposite side of the gantry 12. Referring now to FIG. 3, detector assembly 18 is formed by a plurality of detectors 20 and data acquisition systems (DAS) 32. The plurality of detectors 20 sense the projected x-rays 16 that pass through a medical patient 22, and DAS 32 converts the data to digital signals for subsequent processing. Each detector 20 produces an analog electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. An image reconstructor 34 (i.e., "image processor") receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. To that end, the operator supplied commands and parameters may be used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves patients 22 through a gantry opening 48 of FIG. 1 in whole or in part. In a step-and-shoot mode, for example, the table 46 may be held stationary during the acquisition of at least part of the projection data. In case of a helical scan, however, the table 46 may be moved to move portions of the object 22 through a gantry opening 48 while projection data is being collected and the gantry 12 is rotating to provide a desired "helical pitch." The helical pitch, as used herein, is a measure of the amount of movement of table 46 per rotation of the gantry 12.

Generally, a rate of rotation of the gantry 12 may be adjusted based on the method of data acquisition. In a single segment reconstruction for example, the rate of rotation of the gantry 12 may be based on an acquired electrocardiogram signal corresponding to the patient, and may typically be set to a maximum possible value corresponding to the scanner. In a multi-segment reconstruction, however, the rate of rotation of the gantry 12 may be based on a desired cardiac cycle of the patient or a measured average cardiac cycle rate. Particularly, the DAS 32 may collect projection data from two or more heart cycles such that the combined collected data corresponds to at least 180 degrees plus fan angle for the desired cardiac phase. To that end, in different embodiments, the projection data may be collected by employing a helical scan, a step and shoot acquisition, one or more segments of a circular scan, and so on. In further embodiments, a detector wide enough to cover the whole heart or organ of interest in one rotation may be employed to acquire projection data from one or more heart cycles for performing a single segment or a multi-segment reconstruction.

Accordingly, the DAS 32 may be used to acquire the projection data corresponding to the object 22 for a range of views. The DAS 32 may further acquire information corresponding to a view angle of the radiation source 14 at the time of acquisition of the projection data. Alternatively, the gantry motor controller 30 may measure a view angle of the radiation source 14 at the time of acquisition of the projection data. Particularly, the acquired information may facilitate a determination of which components of the image are acquired at which instant of time. Further, this acquired information may be utilized to determine the source location at the particular instant of time, and therefore determine the direction of the object motion that can be best captured at the particular instant of time and view angle.

As further shown in FIG. 3, a workstation 50 is provided that is separate from CT system 10. The workstation 50 includes one or more processors 52 and a memory 54 therein to enable the processing of image data and storage of processed images. The workstation 50 is operatively connected to CT system 10, so as to be able to transmit and receive imaging data and/or images to and from the CT system. According to embodiments of the invention, workstation 50 may be located in proximity to CT system 10 or be located remotely therefrom, being operatively connected thereto by via one of any known communications system. According to one embodiment, the workstation 50 may be in the form of a "server" type product offering where additional image processing/image correction can be done on images acquired from any scanner in the hospital scanner suite or from images obtained from other sources within the network of the institution.

In operation, the workstation 50 receives images or image data from CT system 10 in order to perform additional system-specified or operator-specified processing thereon. That is, while partial image processing and image reconstruction is performed at the CT system 10 by way of image reconstructor 34 and/or computer 36, certain image processing functions, such as image correction, are carried out at workstation 50. The performing of some of the image processing at workstation 50 minimizes the computational burden of image reconstructor 34 and computer 36 in CT system 10. Such a distribution of the image processing between image reconstructor 34/computer 36 and workstation 50 can be beneficial as compared to solely using reconstruction processors associated with the CT system 10 to perform all of the image processing that might be associated with a patient imaging operation. For example, if the image processing performed by the reconstruction processors associated with the CT system 10 is too computationally intensive, performance of the CT system 10 may be degraded. Furthermore, if such computationally intensive image processing is performed solely by the reconstruction processors associated with the CT system 10, the image processing operation might unnecessarily be prolonged, so as to possibly impede the performing of a subsequent patient imaging operation on CT system 10.

According to one embodiment of the invention, image data is acquired by CT system 10, with one or more sets of images then being reconstructed by image reconstructor 34 of CT system 10 using standard acquisition and reconstruction techniques, with images within each set corresponding to different axial locations through the scanned object. A determination is then made, either at CT system, workstation 50, or a combination thereof, as to whether image correction is to be prescribed or required with regard to the reconstructed image. According to embodiments of the invention, this determination can be made in a plurality of different ways. In one embodiment, this determination is made by way of analysis of the acquired raw data and/or of the reconstructed image(s). According to another embodiment, a determination (e.g., by a technologist, and/or based on physiological parameters) is made prior to or during scanning that a given exam might be "challenged" such that additional image processing might be desired or required. In yet another embodiment, the image(s) reconstructed at CT system 10 by image reconstructor 34 would go through a preliminary step during which a rough image quality metric is calculated for the image(s) and compared to a pre-determined threshold metric. If the image quality metric for the reconstructed image(s) does not meet the pre-determined image quality threshold, the image(s) are identified as desiring or requiring correction.

In each of the above embodiments, when image correction is prescribed/required, locations of interest are identified where such image correction is to be applied. According to embodiments of the invention, locations of interest for performing image correction may be identified using one or more of: (A) extracted features from the dataset, i.e., feature identification of coronaries, chamber walls, etc., (B) comparisons of reconstructed images corresponding to different phases, with significant differences in the images indicating cardiac motion at that location/region, (C) a full volume or cardiac region filled with a regular grid, (D) human interaction, such as user selection at workstation 50 of a particular location for further processing or a semi-automated approach where the system suggests certain locations which are then accepted or rejected by a user, (E) an image quality metric applied to the imaged region, or a combination of such techniques.

According to one embodiment of the invention, images reconstructed by image reconstructor 34 are placed into a digital imaging and communications in medicine (DICOM) file for transfer to workstation 50, with the DICOM files being placed in a queue to be transferred over a computer network (not shown) to workstation 50 using a standard DICOM transfer protocol. A private DICOM tag is included in those DICOM files in which images are flagged that require image correction, with a value associated with that tag to specify the image correction to be applied to the images. According to one embodiment, one or more image datasets are compressed before being transferred over the network. In particular, the raw data and/or the reconstructed datasets are very similar, or may even share common data points, offering the potential for very efficient data compression.

When the DICOM files are received by the workstation 50, software checks for the presence of the private DICOM tag and, if found, initiates the image correction specified by that tag. Image correction is thus performed on specified images by workstation 50, resulting in a corrected or processed set of images (or 3D volume image) that is then stored for recall and review at the workstation. According to one embodiment, workstation 50 is further configured to optionally perform additional processing that has been requested for the patient imaging exam, with such "background processing" being automatically initiated once the corrected dataset or image is available. Both the corrected image dataset/image and subsequent processing results are available for review and can be recalled once a clinician desires to review the exam.

By utilizing a workstation 50 that is available to the clinician or a clinician's assistant (3D technician), some deficiencies in image correction can be rapidly edited and reprocessed. For example, if parts of the ROI were not properly identified, the clinician may provide this information via a user interface (not shown) on workstation 50 by using his or her expert knowledge of the location of interest. Image correction may then be applied to these regions using the workstation 50, which does not impact the CT system technologist or CT system 10 in any way. Clinician interaction via workstation 50 could also feed into the image quality metric determination set forth above, with such interaction being used to down-select locations. Thus, user interaction can feed both directly into the image correction and/or the image quality metric determination.

Figure 4:
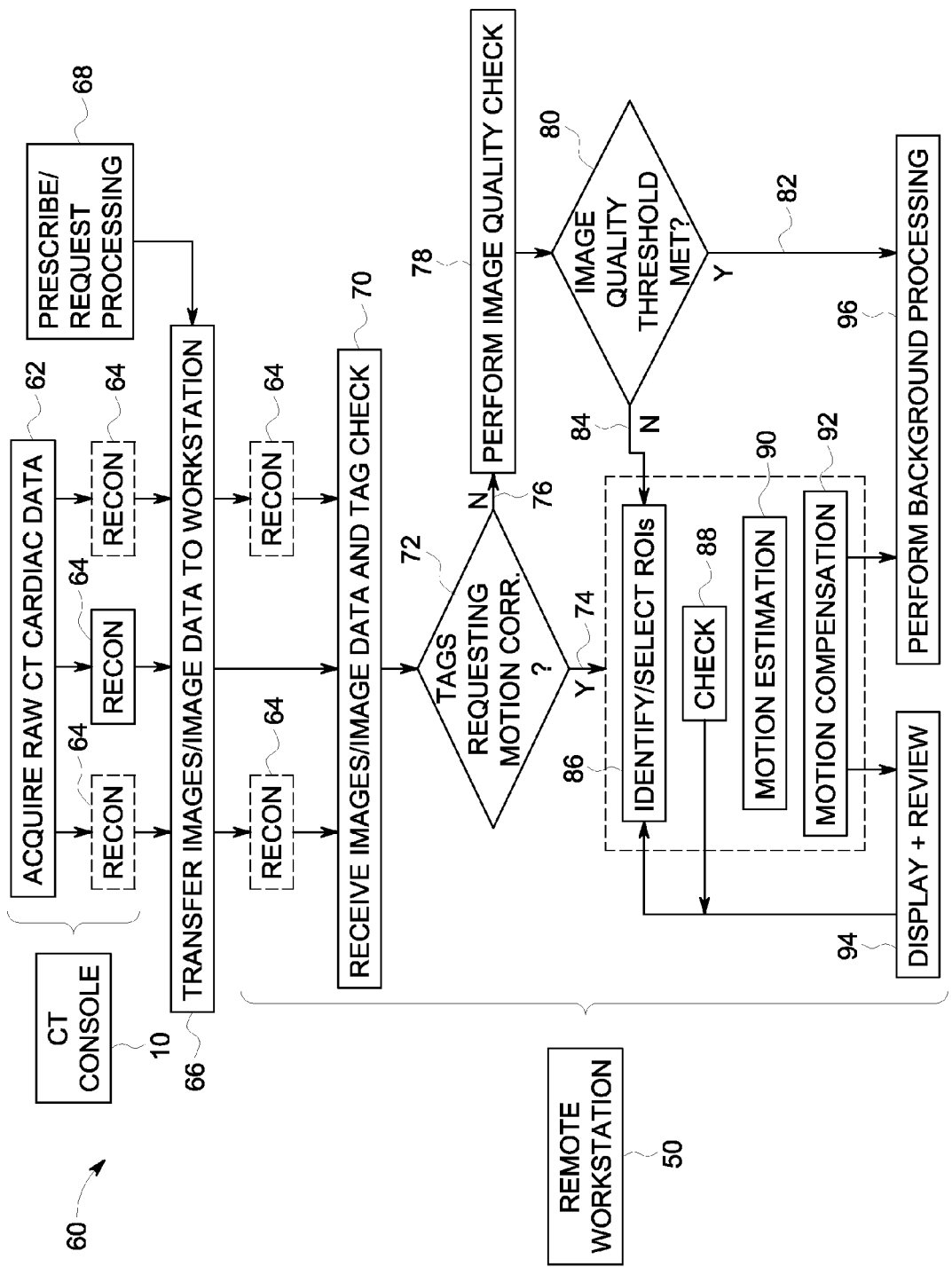
FIG. 4 is a flowchart illustrating a technique for distributed image processing of tomographic images according to an embodiment of the invention.

Referring now to FIG. 4, and with continued reference to FIGS. 2 and 3, a technique 60 is shown for distributed image processing according to an exemplary embodiment of the invention. In the embodiment of FIG. 4, the technique 60 is implemented during a cardiac CT imaging exam of a patient, such as one performed by the CT system 10 of FIGS. 2 and 3 for example, for purposes of correcting image artifacts or blurring that might be present in reconstructed images that result from motion of the patient anatomy during the imaging scan. In acquiring and processing such cardiac image data, it is recognized that even with state-of-the-art imaging techniques, objects or ROI within the image field of view, such as coronary arteries or portions thereof, may have moved during the image data acquisition. This motion of coronary arteries in the ROI can result in significant image blurring or other motion artifacts in a reconstructed cardiac CT image. To account for such motion, image processing techniques that remove or reduce the blurring or other motion artifacts can be applied, such as NRR type approaches or the image processing algorithm described in U.S. patent application Ser. No. 12/638,693 to Pack et al., which is herein incorporated by reference. However, such image processing algorithms for motion correction can be computationally intensive and thus may lead to prolonged processing times if processing is performed only at the CT system 10 (i.e., on the image reconstructor 34 and computer 36). As such, a portion of the image processing required for generating motion corrected images is performed by a separate workstation 50, according to embodiments of the invention. The CT system 10 is thus relatively minimally impacted by the additional processing requirements, based on the majority of the processing being done on workstation 50.

As shown in FIG. 4, technique 60 begins with the acquisition of raw cardiac CT data at STEP 62, with the CT cardiac data being acquired via one of any number of known scanning techniques typically employed in cardiac imaging. According to one embodiment, the CT cardiac data is acquired for a prescribed time or phase in the cardiac cycle, such as 75% of the way into an R-R interval. It is recognized that it may be advantageous to acquire additional CT cardiac data to serve a "padding" function, and thus additional data corresponding to slightly earlier and slightly later times from the 75% mark/point of the R-R interval is acquired, such as at times corresponding to 80 degrees of gantry rotation from the data acquired at the 75% mark of the R-R interval. Upon acquisition of the cardiac CT image data, sets of images are then reconstructed at STEP 64, where reconstruction can be performed for the 75% target phase, as well as phases at small offsets from the target phase. In the example above, images are reconstructed with the sets of cardiac images corresponding to the data acquired at the 75% mark of the R-R interval and the data acquired at +/−80 degrees of gantry rotation therefrom. The images can be generated using standard reconstruction techniques, with images within the sets corresponding to different axial locations through the scanned object. While two additional sets of cardiac images are described as being reconstructed in the present embodiment, corresponding to the time intervals associated with respective +/−80 degrees of gantry rotation, it is recognized that more or less than the two additional sets of images may be reconstructed, and the time interval between images may be other than the time associated with 80 degrees of gantry rotation.

In performing the reconstruction of the image data sets at STEP 64, at least one of the image sets is reconstructed by the reconstruction processors on the CT system 10, as illustrated in FIG. 4. According to embodiments of the invention, the additional image sets can be reconstructed either by the reconstruction processors on the CT system 10 or by reconstruction processors 52 on the separate workstation 50, as illustrated by the dashed lines for the reconstruction STEP 64 in FIG. 4. In the embodiment where the additional image sets are reconstructed by the reconstruction processors 52 on workstation 50, the reconstruction would be performed subsequent to a transferring of imaging data to workstation 50 that is performed at STEP 66.

As shown in FIG. 4, the acquired CT cardiac data, in the form of either the reconstructed images or raw image data, are transferred to workstation 50 at STEP 66 for further image correction (i.e., motion estimation and correction). According to an exemplary embodiment, the images are placed into a DICOM file structure at STEP 66, in order to provide a simplified and efficient format for transfer. The DICOM files are then placed in a queue to be transferred over a computer network to workstation 50 using a DICOM transfer protocol. In one embodiment of the invention, one or more datasets are compressed at STEP 66 before being transferred over the network. In particular, generally the raw image data and/or the one or more reconstructed datasets are very similar, or may even share common data points, offering the potential for very efficient data compression. Thus, in one embodiment, instead of transferring the second, third, etc., datasets themselves, a compressed difference between the second/third datasets and the first dataset may be transferred.

According to one embodiment, a private DICOM tag is included or provided with each image set at STEP 66, together with a value associated with that tag, to specify that image correction is to be applied to the images. According to one embodiment of the invention, a specific DICOM tag is generated based on information from real-time monitoring of the patient's heart prior to (or during) the scan acquisition itself, such as heart-rate and heart-rate variation measures, with a determination being made from this information as to whether a given exam might be temporally "challenged" such that motion correction will most likely be desired. According to another embodiment, a specific DICOM tag is generated based on a user-request, with such request able to be made from either console 40 of CT system 10 or from workstation 50 (FIG. 3). In each case, DICOM tags are generated specifying that motion correction will be automatically prescribed such that this image correction can begin once the CT cardiac data acquisition is complete or once enough of the acquisition data is available to begin processing before the acquisition is fully complete. The prescribing or instructions to automatically initiate motion estimation and correction is illustrated at STEP 68 in FIG. 4.

At STEP 70, the DICOM files are received by the workstation 50 and software stored on the processors 52 thereon check for the presence of the private DICOM tag indicating that motion correction should automatically be performed as specified by that tag. A determination is made at STEP 72 as to whether the tags are included in the image sets, indicating that motion correction on the images should automatically be initiated. If a DICOM tag is found 74, technique 60 skips to STEP 86, where motion estimation and correction on the images is automatically initiated by the processors of workstation, as will be explained in further detail below.

If, however, no DICOM tag is attached to the image sets 76, then motion estimation/correction is not initiated and technique 60 instead then continues to STEP 78, where an analysis is performed determining whether or not motion correction of the image sets is required. According to one embodiment, a rough image quality check is performed on the reconstructed images to determine if motion correction is necessary. That is, an image quality metric is calculated for the reconstructed images and compared to a pre-determined image quality metric threshold value. In one embodiment, this metric is calculated at particular locations/features in the cardiac region, such as locations selected/determined based on features extracted from the image data, user-selected locations, and/or comparisons of reconstructed images corresponding to different phases, with significant differences in the images indicating cardiac motion at a location where image quality should be checked. In another embodiment the image quality metric is calculated on a dense grid covering the cardiac region. In still another embodiment, STEP 78 may be performed in an interactive manner, where regions are pre-selected during the computation of the image quality metric, and their selection (for further motion estimation and compensation processing) is then accepted or rejected by a human observer.

A determination is made at STEP 80 as to whether the image quality metric for the reconstructed images meets the pre-determined image quality metric threshold value. If the image quality metric for the reconstructed images meets the pre-determined image quality metric threshold value 82, then it is determined that no further image processing for motion correction purposes is required. Technique 60 can then proceed with any optional image processing that is desired, as indicated at STEP 96, such as heart segmentation, stenosis measurements, ejection fraction calculations, etc. If, however, the image quality metric for the reconstructed images does not meet the pre-determined image quality metric threshold value 84, it is determined that motion correction should be prescribed for those images.

In determining that motion correction should be prescribed, either by way of the presence of DICOM tags automatically instructing the performing of motion correction or by way of the image quality metric for the reconstructed images not meeting the image quality metric threshold, technique 60 continues to STEPS 86-92, where motion correction of the images is performed. According to one embodiment of the invention, the motion correction is accomplished by way of the algorithm set forth and described in U.S. patent application Ser. No. 12/638,693 to Pack et al., which is herein incorporated by reference, with the disclosure thereof being summarized herebelow.

In performing the motion correction, technique 60 continues at STEP 86, where locations of interest in the cardiac region are identified or selected on which motion estimation and correction is to be performed. For the case of cardiac imaging and the correcting of motion blurring or artifacts from moving coronary arteries, locations that correspond to coronary arteries are identified, and, in particular, centerlines through coronary arteries are identified. Locations corresponding to other anatomical regions or objects can also be identified, such as locations corresponding to ventricles, cardiac walls, valves, or the whole heart. In another embodiment, pixel locations are chosen from a regularly spaced spatial grid. In yet another embodiment, a hybrid version is used where pixels representing features of interest (e.g., coronaries, etc.) within the dataset are identified and are augmented by additional points in regions where no feature pixels are nearby. Selection of locations of interest may also be supported by the user (e.g., interactively), with an image quality metric evaluation being performed to downselect the locations of interest.

According to one embodiment of the invention, technique 60 continues at STEP 88 with a check being performed regarding the completeness of the selected locations of interest acquired, with this check being performed before the motion estimation and correction are applied. In one embodiment, the locations of interest identified at STEP 86 as requiring motion correction (and the pixel locations associated therewith) can undergo a "sanity check," either automatically or with human intervention. For example, it may be checked whether all major branches of the coronary tree have been identified. This check may be performed by inspecting the point cloud of identified pixels/locations of interest by itself, or in combination with one or more of the reconstructed volumes (e.g., using an overlay display).

Upon performing of the check at STEP 88, technique 60 continues at STEP 90 where motion estimation is performed. For regions around each of the identified locations of interest, such as the coronary arteries, motion estimation is performed utilizing the one or more temporally displaced sets of images to estimate the motion at each of the locations of interest pixels, such as the coronary centerline locations during the scan data acquisition. At STEP 92, motion correction or compensation is then applied to the image data based on the estimated motion. In one embodiment, STEP 92 further includes performing of an inspection of the motion-corrected volume, with locations that still exhibit significant motion blurring then being (partially) re-processed. This inspection step may be performed automatically, using an image quality metric, or in an interactive way, supported by an image quality metric computation. In one embodiment, some information from the initial motion estimation step may be re-used for more efficient processing and selection of an improved motion estimate. The acquisition can be prescribed based on the cardiac application in mind, and therefore for certain applications, such as coronary artery imaging, minimize the extent of the required data for motion estimation and consequently minimize the administered radiation dose for reliably imaging patients with higher heart rates.

The resulting motion compensated 3D-volume (or set of images) may then be displayed and stored for recall/review, as shown at STEP 94. That is, the motion compensated 3D-volume or set of images can be retrieved once a clinician desires to review the exam results. Additionally, and as illustrated at STEP 96, if additional "background" processing had been requested for the cardiac exam, such as heart segmentation, stenosis measurements, ejection fraction calculations, etc., such automated background processing can be initiated once the motion corrected dataset is available. For certain applications, such as ejection fraction calculations, multiple motion compensated volumes may be generated at STEP 96. The subsequent processing results performed at STEP 96 are also displayed and stored for recall/review once a clinician desires to review the exam.

Beneficially, the technique 60 for distributed image processing thus accommodates and provides computationally intensive image processing/correction that minimally impacts an imaging system and the operations thereof. That is, implementation of technique 60 has relatively minimal impact on the CT scanner since the majority of the computationally intensive image processing/correction is done on a separate/remote workstation, while still providing for improved image quality. The automated generation of additional images that might be needed in conjunction with the motion compensation processing, along with the automatic transfer of those images and the automatic initialization of the processing/correction on the remote processors, also minimizes impact to the technologist at the CT system. Furthermore, data processing is automatically begun at the remote workstation, so any delays to a reading physician are minimized, which allows the physician to more quickly or more accurately review the images and render a more accurate diagnosis, which is of value to the patient.

Furthermore, by utilizing a workstation that is available to the clinician or a clinician's assistant (e.g., 3D technician), some deficiencies in image processing/correction can be rapidly edited and reprocessed. For example, if parts of the ROI, such as sections of a coronary artery were not properly identified during a segmentation processing, the clinician may provide this information via a user interface by using his or her expert knowledge of the location of interest, such as these vessel segments, even in the presence of motion artifact. Motion estimation and correction may then be applied to these regions using the workstation, which does not impact the CT system technologist or CT scanner processor in any way.

A technical contribution for the disclosed system and method is that it provides for a computer implemented method for distributed and coordinated image processing of tomographic images. Processors on a medical imaging system are employed for limited image processing and reconstruction, with image data then being transferred to a separate workstation for further image processing. Modified images are generated at the workstation, with the modified images being stored for subsequent recall and review.

Therefore, according to one embodiment of the invention, an imaging system includes an image acquisition device configured to perform a scanning operation to acquire image data of a subject and an image processor operably connected to the image acquisition device to receive the image data therefrom. The image processor is programmed to reconstruct one or more sets of initial images of a region-of-interest (ROI) from the acquired image data, identify one or more sets of initial images on which to perform image correction, and generate an image correction request for each set of images identified for image correction, with the image correction request specifying a processing operation to be performed on the respective set of images. The image processor is further programmed to transfer the one or more sets of reconstructed initial images to a workstation separate from the imaging system, with the workstation automatically initiating the image correction upon verifying a presence of an image correction request on the sets of initial images so as to generate corrected images.

According to another embodiment of the invention, a method for processing image data includes the steps of acquiring image data sets of a subject by way of an image acquisition device, reconstructing one or more sets of initial images of a region-of-interest (ROI) from the image data sets using a reconstruction processor on the image acquisition device, and transferring the one or more sets of initial images to a workstation separate from the image acquisition device. The method also includes the steps of identifying sets of initial images on which to perform image correction processing, automatically initiating, at the workstation, the image correction processing on each set of initial images identified for image correction processing so as to generate processed images, and storing the processed images at the workstation.

According to yet another embodiment of the invention, a method for distributed processing of computed tomography (CT) cardiac image data includes the steps of acquiring CT cardiac image data of a subject by way of an image acquisition device, reconstructing one or more sets of initial images of a cardiac region from the CT cardiac image data using a reconstruction processor on the image acquisition device, and transferring the one or more sets of initial images and any non-reconstructed image data sets to a workstation remote from the image acquisition device. The method also includes the steps of identifying sets of initial images on which to perform motion estimation and correction and automatically initiating, at the workstation, the motion estimation and correction on each set of initial images identified for motion estimation and correction so as to generate motion corrected images.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An imaging system comprising:
    an image acquisition device configured to perform a scanning operation to acquire image data of a subject; and
    an image processor operably connected to the image acquisition device to receive the image data therefrom, the image processor being programmed to:
        reconstruct one or more sets of initial images of a region-of-interest (ROI) from the acquired image data;
        identify one or more sets of initial images on which to perform image correction;
        generate an image correction request for each set of images identified for image correction, with the image correction request specifying a processing operation to be performed on the respective set of images; and
        transfer the one or more sets of reconstructed initial images to a workstation separate from the imaging system, with the workstation automatically initiating the image correction upon verifying a presence of an image correction request on the sets of initial images so as to generate corrected images.

2. The imaging system of claim 1 wherein the image processor is further programmed to pre-select images for image correction based on a sensed physiological parameter of the subject.

3. The imaging system of claim 2 wherein the sensed physiological parameter comprises at least one of heart-rate and heart-rate variation measures.

4. The imaging system of claim 1 wherein at least one of the image processor and the workstation is programmed to:

calculate an image quality metric for the reconstructed sets of initial images;

compare the image quality metric for the reconstructed sets of initial images to an image quality threshold; and if the image quality metric for the reconstructed sets of initial images does not meet the image quality threshold, then identifying the sets of initial images for performing image correction thereon.

5. The imaging system of claim 4 wherein the image quality metric is calculated at specified locations in the ROI or on a grid covering the ROI.

6. The imaging system of claim 1 wherein the image correction comprises motion estimation and correction for at least part of the ROI to generate motion corrected images.

7. The imaging system of claim 6 wherein the motion estimation and correction is applied at locations of interest corresponding to locations that are selected using at least one of: an image quality metric applied to the ROI, features extracted from the image data, comparisons of the reconstructed one or more sets of initial images illustrating image differences, a regular grid filling the ROI, and user input.

8. The imaging system of claim 1 wherein the image processor is further programmed to:

place the one or more sets of reconstructed initial images and any non-reconstructed image data in a digital imaging and communications in medicine (DICOM) file structure;

attach a DICOM tag to each DICOM file structure on which image correction is to be performed, with each DICOM tag having a value associated therewith specifying the image correction to be performed thereon; and place the DICOM files in a queue for transfer to the workstation.

9. The imaging system of claim 1 wherein the image processor is further programmed to request the workstation to automatically initiate the image correction upon a completed acquisition of the image data or upon acquisition of a required minimum amount of image data, before the completed acquisition of the image data.

10. The imaging system of claim 1 wherein the image processor is further programmed to request the workstation to initiate background image processing on the corrected images.

11. The imaging system of claim 10 wherein the background image processing comprises at least one of heart segmentation, stenosis measurements, and ejection fraction calculations.

12. The imaging system of claim 1 wherein the image acquisition device comprises a computed tomography (CT) scanner.

13. The imaging system of claim 1 wherein the image processor is further programmed to transfer any non-reconstructed image data to the workstation separate from the imaging system.

14. A method for processing image data comprising:

acquiring image data sets of a subject by way of an image acquisition device;

reconstructing one or more sets of initial images of a region-of-interest (ROI) from the image data sets using a reconstruction processor on the image acquisition device;

transferring the one or more sets of initial images to a workstation separate from the image acquisition device;

identifying sets of initial images on which to perform image correction processing;

automatically initiating, at the workstation, the image correction processing on each set of initial images identified for image correction processing so as to generate processed images; and storing the processed images at the workstation.

15. The method of claim 14 wherein identifying sets of initial images on which to perform image correction processing comprises:

applying a digital imaging and communications in medicine (DICOM) tag to each set of initial images on which to perform image correction processing, with each DICOM tag specifying an image correction processing operation to be performed on a respective set of initial images; and performing a check at the workstation for the presence of a DICOM tag on each of the received set of initial images; and wherein initiating the image correction processing comprises automatically initiating, at the workstation, the specified image correction processing operation on each set of initial images having a DICOM tag applied thereto so as to generate the processed images.

16. The method of claim 14 wherein identifying sets of initial images on which to perform image correction processing comprises pre-selecting images for image correction processing based on a sensed physiological parameter.

17. The method of claim 14 wherein identifying sets of initial images on which to perform image correction processing comprises:

calculating an image quality metric for the sets of initial images;

comparing the image quality metric for the sets of initial images to an image quality threshold; and if the image quality metric for the sets of initial images does not meet the image quality threshold, then identifying the sets of initial images for performing image correction processing thereon.

18. The method of claim 14 wherein the additional image correction processing comprises motion estimation and correction for the ROI to generate motion corrected images.

19. The method of claim 18 further comprising performing, at the workstation, additional background image processing on the motion corrected images, wherein the additional background image processing comprises at least one of heart segmentation, stenosis measurements, and ejection fraction calculations.

20. The method of claim 14 further comprising:

inspecting the processed images at the workstation;

identifying locations in the processed images that require further image correction; and re-applying the image correction processing to the identified locations at the workstation.

21. The method of claim 14 wherein the image correction processing is automatically initiated upon a completed acquisition of the image data sets or upon acquisition of a required minimum amount of image data, before the completed acquisition of the image data sets.

22. A method for distributed processing of computed tomography (CT) cardiac image data comprising:

acquiring CT cardiac image data of a subject by way of an image acquisition device;

reconstructing one or more sets of initial images of a cardiac region from the CT cardiac image data using a reconstruction processor on the image acquisition device;

transferring the one or more sets of initial images and any non-reconstructed image data sets to a workstation remote from the image acquisition device;

identifying sets of initial images on which to perform motion estimation and correction; and automatically initiating, at the workstation, the motion estimation and correction on each set of initial images identified for motion estimation and correction so as to generate motion corrected images.

23. The method of claim 22 wherein identifying the sets of initial images on which to perform motion estimation and correction comprises:

calculating an image quality metric for the sets of initial images;

comparing the image quality metric for the sets of initial images to an image quality threshold; and if the image quality metric for the sets of initial images does not meet the image quality threshold, then identifying the sets of initial images for performing additional image processing thereon.

24. The method of claim 23 wherein the image quality metric is calculated at specified locations in the cardiac region or on a grid covering the cardiac region.

25. The method of claim 23 wherein the motion estimation and correction is applied to locations of interest in the cardiac region that are identified using one or more of: features extracted from the CT cardiac image data, comparisons of the reconstructed one or more sets of initial images corresponding to different cardiac phases, a regular grid filling the cardiac region, and user input.

26. The method of claim 22 further comprising automatically performing, at the workstation, at least one of heart segmentation, stenosis measurements, and ejection fraction calculations upon generation of the motion corrected images.

27. The method of claim 22 further comprising:

identifying, at the workstation, any errors in the motion estimation and correction for which re-processing is desired and any cardiac features in the motion corrected images that require further processing; and re-applying motion estimation and correction processing at the workstation based on the identified errors and the identified cardiac features.

* * * * *